Jan. 5, 1943. E. T. WYMAN 2,307,441
VEHICLE SIGNAL DEVICE
Filed May 16, 1941 2 Sheets-Sheet 1
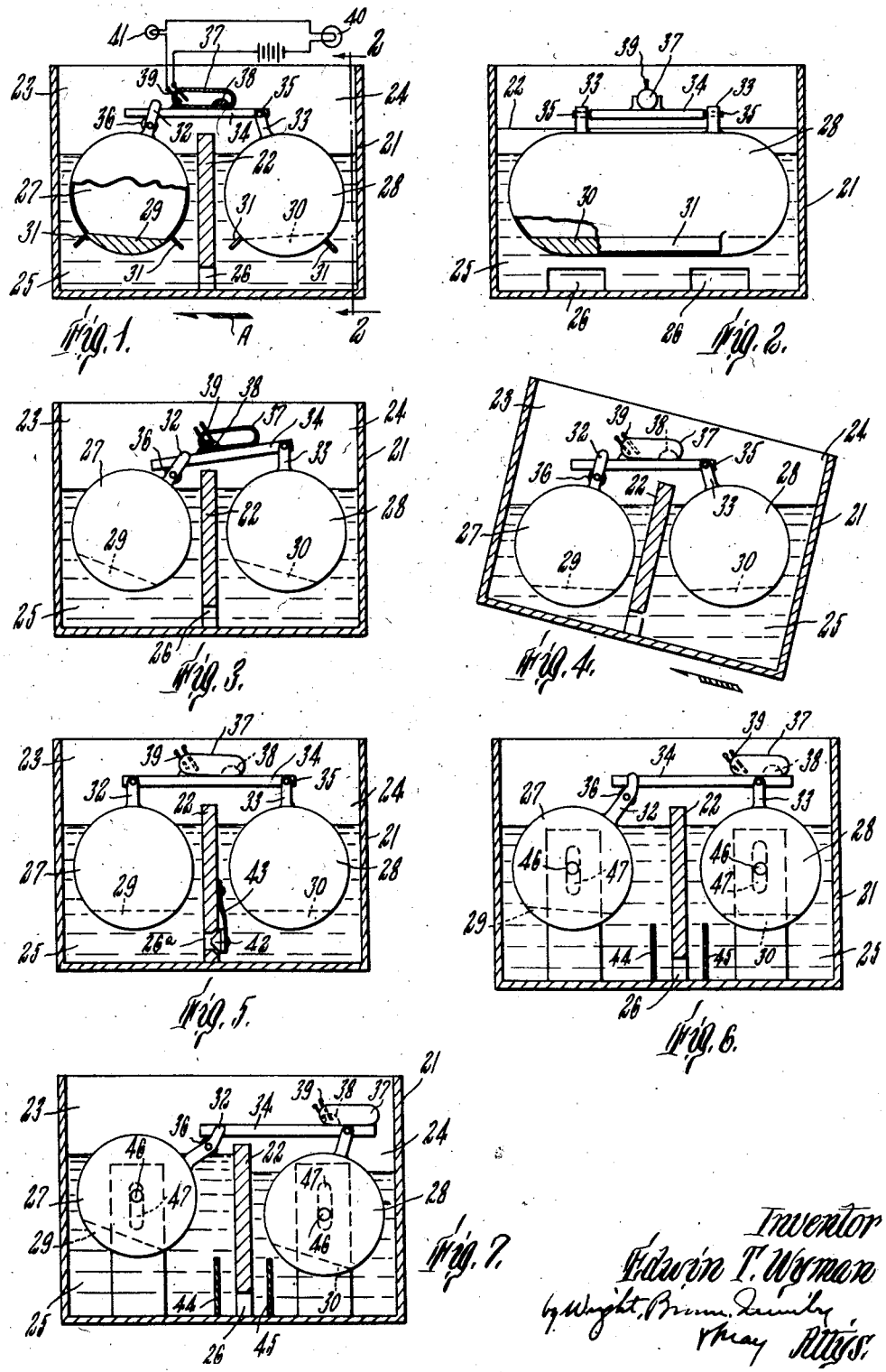

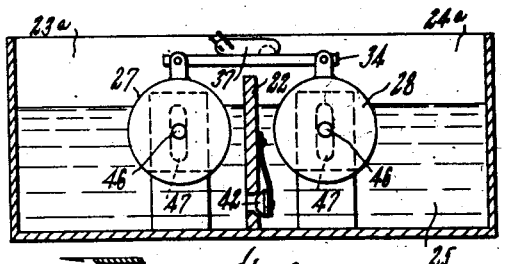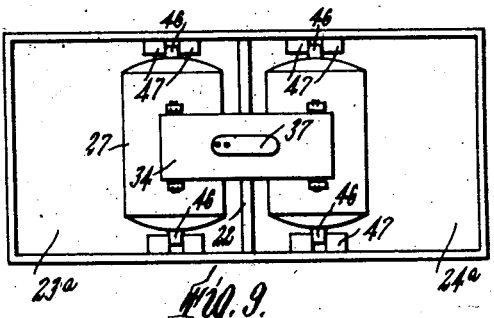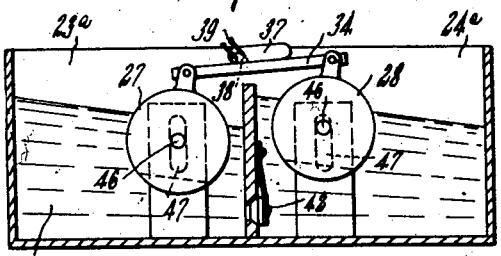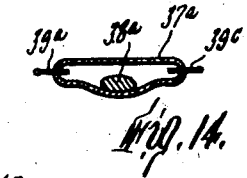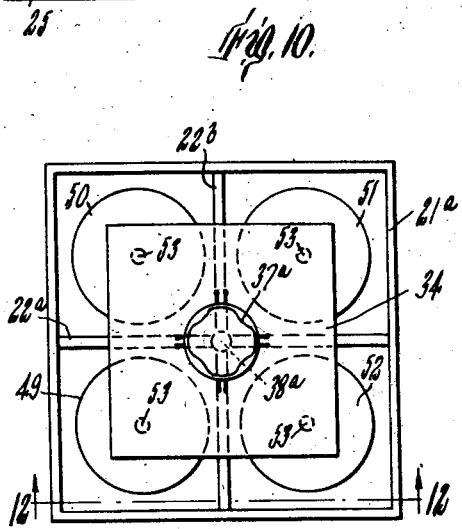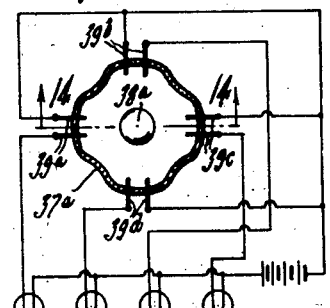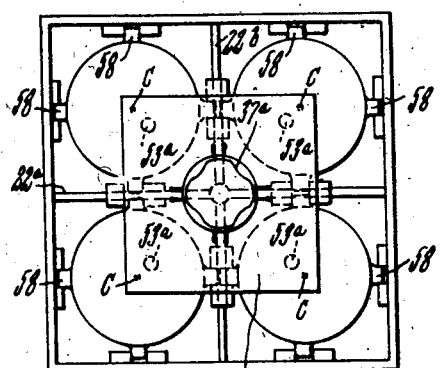

Patented Jan. 5, 1943

2,307,441

UNITED STATES PATENT OFFICE 2,307,441

VEHICLE SIGNAL DEVICE

Edwin T. Wyman, Brookline, Mass.

Application May 16, 1941, Serial No. 393,754

16 Claims. (Cl. 200—84)

Within the meaning of the term "vehicle" as used in this specification are included all mobile carriers of persons and goods, and specifically automobile passenger cars and trucks, aeroplanes and air ships and marine vessels. A specific object is to provide improved and superior means, controlled automatically by momentum, inertia and gravity for showing, with the use of suitable signal devices, when the forward motion of a vehicle is retarded, or when it is accelerated, or when the direction is changed, or combinations of any two or all three of these changes; and for causing these indications to be made with equal accuracy and effect when the vehicle is inclined as well as when it is level. A further object is to provide an improved self leveling support, not only for the purposes above mentioned, but for other purposes as well, adapted to be carried by a vehicle which, when in motion, is subject to being tilted more or less, and in various directions, from a level or horizontal position.

I am aware that heretofore various automatic means, employing devices in the nature of pendulums, have been proposed for indicating speed and direction changes of moving vehicles, and with some of which pendulum means have been proposed to compensate for, or avoid, aberrations due to tilting of the vehicle. My invention accomplishes the results sought by such prior proposals, and does so by improved means involving a float action whereby such aberrations may be more effectively eliminated and the sensitiveness of the apparatus more fully and exactly controlled.

The invention comprises a tank or receptacle containing liquid, divided into two or more chambers by one or more partitions through which flow of the liquid from one chamber to another at a low level is permitted, a ballasted float in each chamber, and signal controlling means, preferably an electric switch, supported by two or more floats jointly and actuated either by movements of the floats or by properties of its own, or both by the floats and by its own properties.

There is shown in the accompanying drawings and described in the following specification several embodiments of the invention which illustrate its principles and some of its uses without showing all of its possible forms and uses.

Fig. 1 is a longitudinal sectional view of a deceleration indicator made in accordance with this invention, including an electric light as a signal and adapted to be mounted on an automobile or other vehicle for showing retardations of the vehicle;

Fig. 2 is a cross section of the same device taken on line 2—2 of Fig. 1;

Fig. 3 is a view similar to Fig. 1 showing the mode of operation of the device when the vehicle is decelerated;

Fig. 4 is a view similar to Fig. 1 but showing the manner in which the device automatically compensates for tilting of the vehicle on which it is installed;

Fig. 5 is a similar view showing a slightly different embodiment of the invention;

Fig. 6 shows another embodiment or variation of the invention in the condition of equilibrium;

Fig. 7 shows the device of Fig. 6 in the condition produced by deceleration;

Figs. 8, 9 and 10 are, respectively, a view similar to Fig. 1, a plan view, and a view similar to Fig. 3, of a further embodiment of the invention;

Fig. 11 is a plan view, and Fig. 12 a cross section on line 12—12 of Fig. 11, of a further form of the invention;

Fig. 13 is an electrical diagram of a switch and signal light combination adapted to be operated by the form of the invention shown in Figs. 11 and 12;

Fig. 14 is a detail sectional view of the switch shown in Figs. 11, 12 and 13, the section being taken on line 14—14 of Fig. 13;

Fig. 15 is a plan view of a variation of the device shown in Figs. 11 and 12.

Like reference characters designate the same parts wherever they occur in all the figures.

Referring first to Figs. 1-4 inclusive, the device there shown comprises a tank 21 which is divided by a partition 22 into two chambers 23 and 24. A body of liquid 25 is contained in these chambers, and there is a port 26, or a plurality of ports, of any preferred area and dimensions, in the lower part of the partition, through which the liquid can flow from either chamber to the other, when the tank is tilted, so as to maintain the liquid in both chambers at the same level.

Floats 27 and 28 are contained in the chambers 23 and 24 respectively. They are ballasted by means of weights 29 and 30 so that, while floating in equilibrium, the same side of each will always be uppermost. These floats may be of any shape and proportions and the ballast may be secured either inside their shells, when the floats are hollow, as here shown, or on the outside. In this illustration they are made as hermetically sealed cylindrical metal shells with spherical ends, and their ballast weights are of suitable mass and suitably disposed to cause them to float with their longitudinal axes horizontal. This form enables them to rotate with minimum resistance in the supporting liquid; but to retard their rotation and damp their oscillations, if desired, vanes 31 may be secured to them externally. There may be none, or any number of such vanes, of any areas suitable to achieve a desired result in the swinging time of the floats. Alternatively, however, the same results may be accomplished by making the floats of noncircular cross section with one or more salient angles.

Standards 32 and 33 project from the upper sides of the two floats and constitute bridge abutments supporting a bridge or platform 34. Here the standards are arranged in pairs, and the bridge or platform 34 is connected by pivot trunnions 35 with the standards 33 of one float (as the float 28) and passes between the standards 32 of the other float (27), resting on a roll 36 pivoted between the latter suports, whereby it may move endwise relatively to float 27.

Bridge 34 serves as base or holder for a signal controller 37. The most convenient of the various types of signal for my purpose is an electric lamp, wherefore I have shown an electric switch as the signal controller; and I have selected the well known mercury switch as the most satisfactory available electric circuit controller; but all without intent to limit the invention to these specific devices. Such mercury switch consists of a sealed and evacuated tube of glass or other dielectric, in which is contained a freely movable globule, or small mass, of mercury 38 and through the wall of which at or near one end pass electrodes or terminals 39. These terminals are connected electrically with the battery of the car and with a signal lamp 40 mounted on the vehicle so as to be visible from a view point at the rear. Preferably also a pilot or telltale lamp 41 is connected in series with the signal lamp and mounted on the instrument board of the car where it can be seen by the driver.

The standards 33 and 32 are inclined toward each other, or otherwise arranged so that the points on which each float supports the bridge or platform are offset, from the vertical line or plane through the axis of that float, toward the other float. Furthermore, the various parts are so arranged that, when the floats are in equilibrium, the bridge or switch support 34 is substantially horizontal and the bottom of the switch is nearly horizontal, but has a sufficient inclination to cause the mercury 38 to be withdrawn by gravity from the electric terminals 39.

When the vehicle which carries the device is level and proceeding at uniform speed, the parts have the position of equilibrium shown in Fig. 1. It is to be understood that the tank is mounted with the chamber 23 forward of the chamber 24 with respect to the ends of the vehicle, and it may be assumed that the vehicle is traveling in the direction of the arrow A in Fig. 1. If the vehicle is retarded, the momentum of the weights causes them to swing forward and to rotate the floats about their respective axes. The angular movement thus imparted to the standards 32 and 33 causes the rear end of the switch support 34 and of switch 37 to be raised and the forward end to be lowered, whereby gravity causes the mass of mercury to roll forward and complete the circuit between the separated terminals 39. The momentum of the mercury contributes to the same effect.

In fact momentum of the mercury alone may be relied on in some situations to close the circuit. An arrangement of this character is shown in Fig. 5, where the connections between the switch support 34 and the floats are vertically over the axes of the respective floats. Then the platform remains parallel to itself in all degrees of rotation of the floats and momentum alone causes the mercury to roll forward and complete the circuit.

A combination of the two arrangements of supports for the bridge or switch support is shown in Fig. 6. Here the pivotal connection 35 with the float 28 is vertically above the axis of that float, and the point of engagement at 36 with the float 27 is offset toward float 28. The switch support then is inclined relatively less, when the floats are rotated by deceleration of the vehicle, than where both sustaining uprights are inclined toward one another, other things being equal.

With all forms of the invention, tilting of the vehicle either up hill or down hill causes a gravity flow of the liquid from the upper to the lower chamber and maintains the liquid at the same level in both chambers, whereby the relationship of the floats, platform and signal controller to one another remains unchanged, and they cooperate as previously described when the vehicle is retarded. This situation is shown in Fig. 4 with respect to the embodiment of Figs. 1 and 2 in a vehicle traveling up hill. Essentially the same conditions obtain in all other embodiments, and an exactly similar but oposite condition when the vehicle travels down hill.

The effect of surging of the flotation liquid has been ignored in the preceding description and in the showing of Fig. 3. Actually momentum tends to throw this liquid to the forward end of the tank when the vehicle slows down. This tendency is in large measure nullified by the partition 22, which serves as a baffle. It is further controlled and limited by selection of a sufficiently viscous or sluggish liquid and by the dimensions of the port or ports 26, but will occur measurably under prolonged retardation unless prevented by positive means. It may be wholly prevented by check valves in connection with the ports. Fig. 5 shows a port 26a in the baffle partition, having a valve seat with which cooperates a check valve 42 biased by suitable means, (such as a leaf spring 43 secured to the partition and supporting the valve), so that it is normally open but is adapted to be closed by the beginning of a surge from chamber 24 to chamber 23. It is not closed by the slow flow of liquid occurring when the vehicle tips down hill. Additional baffles 44 and 45 may be used instead of the check valve. They are located at opposite sides of the partition 22 across the port or ports, and far enough therefrom to permit slow passage of the liquid under gravity, as shown in Figs. 6 and 7. These additional baffles provide a further restraint to surging, greater than that afforded by the partition alone.

However, where the supporting points for the signal controller of either or both floats are offset toward the other, a considerable rise of liquid level in the forward chamber due to surging may take place without preventing operation of the signal. This fact is illustrated in Fig. 7, which shows the liquid in the chamber 23 at a considerably higher level than that in chamber 24, at the end of a prolonged period of retardation, and shows the switch still in the circuit closing condition. With suitable baffling provisions, such as here shown, and floats offering sufficiently small resistance to rotation in the liquid, the signal will be operated instantly upon even a slight deceleration, and will give its indication continuously while the liquid slowly flows into the forward chamber. It is perfectly feasible by appropriate design to effect a continuous showing of the signal until the vehicle comes to a full stop gradually and with uninterrupted deceleration.

It is to be noted, however, that the auxiliary baffles so greatly retard displacement of the liquid that only in the rarest circumstances will such a difference of levels occur as depicted in Fig. 7. The showing there of a difference of levels is simply to illustrate the fact that the device with an offset pivot on one float, or oppositely offset pivots on both floats, will operate perfectly in spite of a difference of levels.

The switch may be supported midway between the floats so that its weight is borne equally by both, or at either side of the middle so that a larger fraction of the weight is borne by one float than the other. Figs. 6 and 7 show an extreme condition where the switch is mounted with its center of gravity vertically over the axis of float 28 and the pivot for the opposite end of the platform is offset from the vertical diameter of float 27. This arrangement makes a highly sensitive instrument.

In many circumstances the length and width of the chambers are made so nearly equal to the length and width of the floats that no other means than the chamber walls is needed to retain the floats in their suitable operating positions. This is the condition illustrated in Figs. 1-5, (and also Figs. 11 and 12 later described). The clearances between the chamber walls and the floats are here shown with some exaggeration; actually the floats will bear on the outer walls when in equilibrium and may touch the walls at other points at other times. However, the floats may be otherwise confined, as by axially alined trunnions 46 on their ends contained loosely in vertical guideways 47 secured to the adjacent walls of the tank, as shown in Figs. 6-10.

Surging or displacement of the liquid may be utilized to augment the swinging pendulum effect of the floats to raise the rear end of the switch platform and depress the forward end. This situation is shown in Figs. 8, 9 and 10. Here the forward chamber 23a is extended to a considerable distance forward of the float 27 and the rear chamber 24a is extended to a considerable distance to the rear of float 28; the floats being situated near the partition 22 and confined against horizontal displacement by trunnions 46 and guides 47. Deceleration of the vehicle then causes surge of the liquid toward the forward ends of both chambers, causing float 27 to be lowered and float 28 to be raised at the same time that these floats are partially rotated by their ballast weights. Preferably a check valve 42 like or equivalent to that previously described is employed in this combination to insure a disparity of levels of the character described.

It will be apparent that with the devices previously described, installed as described, acceleration of the vehicle will cause movements of the floats opposite to those described, with the result merely of inclining the switch further in the manner which insures separation of the mercury from the electrode. No signal is given then. But if a distinctive signal for acceleration is desired, any of the embodiments herein contemplated, and parts thereof, can be installed in a reversed manner. Or the vehicle may be equipped with two such devices, one arranged to indicate deceleration and the other oppositely disposed to indicate acceleration.

However, the principles of two such devices may be combined in a single unit apparatus to show acceleration, deceleration and changes of direction to both right and left. The device shown in Figs. 11 and 12 embodies such a combination. The tank 21a is here divided by partitions 22a and 22b into four chambers, in each of which is a ballasted float; such floats being designated 49, 50, 51 and 52. These floats are able to roll in any direction by inertia of their weights, and are preferably made as spheres, although that form is not essential. They support a platform or bridge 34a by means of ball and socket joints 53, or the equivalents thereof; each float carrying one of the members of one of such joints on a standard rising from its highest point. The chambers are interconnected for transmission flow of liquid by ports 26 at low levels in the several partitions, as in the preceding embodiments, which ports may be guarded by baffles or check valves, if desired. A switch 37a is mounted on the platform 34a. This switch is of symmetrical configuration in plan and preferably has a shallow pocket in its center wherein a small mass of mercury 38a normally resides under the force of gravity, and from which it may be dislodged in any direction by its momentum, or by gravity when tilted. Pairs of unconnected circuit terminals or electrodes 39a, 39b, 39c and 39d are mounted in the walls of the switch at locations angularly distributed around the center, and these terminals are connected with a source of electricity and are in separate connection with signal lamps 54, 55, 56 and 57, respectively. Momentum, inertia and centrifugal force cause the mercury to roll forward or backward, or to one side or the other when the vehicle slows down, speeds up, or turns to either side, thus closing the circuit of one or another of the lamps, or more than one at the same time, appropriately mounted and designated to indicate the character of action thus performed. Such a device is useful in aviation and particularly with airplanes flying in formation, to indicate to pilots following in formation when the leading plane makes a change of speed or direction. It is part of my contemplation in this connection to provide more than the number of pairs of contacts here shown, and dispose them otherwise than in rectangular arrangement and in connection with suitable signal means so as to show simultaneously a change of both speed and direction, when the vehicle is either accelerated or decelerated while making a turn.

The device with pivot supports for the bridge or platform directly over the centers of gravity and of buoyancy of the floats, which is that just described, provides a self leveling means for the platform which maintains it level however the vehicle is tilted. It is useful for other purposes than that here set forth as, for instance, for supporting a compass. Where it is desired to tilt such a platform, as for utilizing gravity to operate a switch, the supports for the platform may be offset from the centers of the several floats toward the center of the collection of floats. This is shown in Fig. 15, where the points c represent the projections of vertical lines through the centers of buoyancy and gravity of the several floats, and the broken circles 53a represent supporting points, such as the ball and socket joints previously described, which are offset in the manner just described. In order to maintain the described positions of the supporting points in this case, the floats may be provided with four pivots 58 spaced 90° apart around the horizontal middle of the float and engaged with guides mounted on the four walls of the several float chambers, such guides being free enough to permit rolling of the floats in any direction.

Similar effects to those described with relation to the four-float combination may be also obtained by an equivalent combination of three floats and a platform or bridge, in triangular arrangement, and with float compartments and guides (where needed) in corresponding angular arrangement.

It is clear from the drawings that the platforms or equivalent members supported by the floats extend across the partitions dividing the float chambers, the partitions being of sufficiently low height, or cut away, to accommodate such parts.

It should be further explained that, when installed for use, the tank or container is closed by a tight cover and sealed so that the liquid may not escape when slopped about. Preferably also a nonvolatile liquid is used. Oils of various gravities and glycerine are examples of liquids suitable for the purpose. A wide range of degrees of sensitivity may be obtained by selection of a liquid having suitable viscosity.

Various features of the different embodiments here shown may be combined with one another in other permutations than those shown herein, as will be obvious to those skilled in the art, and are all within the scope of my invention. Also, other forms of switch or signal controller embodying a movable control element, and other forms of signal than electric lamps may be used.

What I claim and desire to secure by Letters Patent is:

1. A device for the purposes set forth, comprising separate chambers containing liquid and connected together for flow between them of the liquid under gravity impulsion so as to maintain the same level of liquid in all the chambers under equilibrium conditions, a float supported by the liquid in each chamber, each float being free to turn about a horizontal axis and being ballasted to maintain the same side uppermost when in equilibrium, and a bridge engaged with and supported by a plurality of said floats in a manner which permits free turning of the floats about their respective horizontal axes.

2. A device for the purposes set forth, comprising separate chambers containing liquid and connected together for flow between them of the liquid under gravity impulsion so as to maintain the same level of liquid in all the chambers under equilibrium conditions, a float supported by the liquid in each chamber, each float being free to turn independently about a horizontal axis and being ballasted to maintain the same side uppermost when in equilibrium, a bridge engaged with and supported by a plurality of said floats with its weight partially borne by each float of such plurality, and indicator-controlling means mounted on said bridge.

3. A device for the purposes set forth, comprising separate chambers containing liquid and connected together for flow between them of the liquid under gravity impulsion so as to maintain the same level of liquid in all the chambers under equilibrium conditions, a float supported by the liquid in each chamber, each float being free to turn about a horizontal axis and being ballasted to maintain the same side uppermost when in equilibrium, a bridge, and provisions whereby the bridge is supported by a plurality of said floats in a manner permitting translative and angular movement of the bridge relative to said floats in consequence of rotational movement of said floats about their respective axes.

4. A device for the purposes set forth, comprising separate chambers containing liquid and connected together for flow between them of the liquid under gravity impulsion so as to maintain the same level of liquid in all the chambers under equilibrium conditions, a float supported by the liquid in each chamber, each float being free to turn independently of every other float about a horizontal axis and being ballasted to maintain the same side uppermost when in equilibrium, said floats having bridge abutments rising from their upper portions, and a bridge supported on and by said abutments.

5. The device set forth in claim 4, in which the points of contact between the bridge and bridge abutments are vertically alined with the rotational axes of the respective floats.

6. The device set forth in claim 4, in which one of the engagement points between the bridge and bridge abutments is offset laterally from vertical alinement with the rotational axis of its supporting float.

7. The device set forth in claim 4, in which the engagement points between the bridge and bridge abutments are offset laterally toward one another from vertical alinement with the rotational axes of the respective floats.

8. The device set forth in claim 4, in which the bridge abutment of one float engages the bridge at a point or points vertically alined with the rotational axis of that float, and the bridge abutment of another float is offset laterally from vertical alinement with the rotational axis of the last named float.

9. The device set forth in claim 4, in which the bridge abutment of one float engages the bridge at a point or points vertically alined with the rotational axis of that float, and the bridge abutment of another float is offset laterally toward the before-named float from vertical alinement with the rotational axis of the last named float.

10. The device set forth in claim 4, combined with a signal controller mounted on said bridge having a movable actuating element displaceable by momentum and inertia to perform a signal-controlling action.

11. The device set forth in claim 4, combined with an electric switch mounted on said bridge having a movable circuit closer adapted to be displaced by inertia and momentum to make or break an electric circuit.

12. The device set forth in claim 4, in which the bridge abutment of one float engages the bridge at a point or points vertically alined with the rotational axis of that float, and the bridge abutment of another float is offset laterally toward the before-named float from vertical alinement with the rotational axis of the last named float, combined with a signal controller mounted on the bridge in a location near the float first named so that its weight is largely supported thereby, said controller having a movable operating element shiftable into operative and inoperative positions, respectively, by tilting of the bridge at different inclinations consequent upon rolling of the floats about their respective axes.

13. A device for the purposes set forth, comprising separate chambers containing liquid and connected together for flow between them of the liquid under gravity impulsion so as to maintain the same level of liquid in all the chambers under equilibrium conditions, a float supported by the liquid in each chamber, each float being free to turn about a horizontal axis and being ballasted to maintain the same side uppermost when in equilibrium, means to block surging of the liquid from one chamber to the next under inertia and momentum impulsion, and a bridge engaged with and supported by a plurality of said floats.

14. A device for the purposes set forth comprising a plurality of chambers, of which the number is greater than two, in symmetrical arrangement around a central point, all of said chambers being connected for interflow of liquid among them and maintenance of the same liquid level in all under equilibrium conditions, with provisions for restricting the speed of flow from chamber to chamber, a float in each chamber supported by the liquid therein and being free to turn about two horizontal axes angularly related to each other, and being ballasted to maintain the same side uppermost when in equilibrium, a bridge extending partially over the floats, and supports for said bridge rising from the several floats having universal pivotal connection with the bridge.

15. A device for the purposes set forth comprising a plurality of chambers, of which the number is greater than two, in symmetrical arrangement around a central point, all of said chambers being connected for interflow of liquid among them and maintenance of the same liquid level in all under equilibrium conditions, with provisions for restricting the speed of flow from chamber to chamber, a float in each chamber supported by the liquid therein and being free to turn about two horizontal axes angularly related to each other, and being ballasted to maintain the same side uppermost when in equilibrium, a bridge extending partially over the floats, and supports having spherical ends rising from the floats and contained in sockets in under portions of the bridge, whereby the bridge is connected with the floats, and supported, by ball and socket joints.

16. The device set forth in claim 14, in which the platform supports are all inclined from the centers of the respective floats toward the vertical projection of the central support around which the chambers are disposed.

EDWIN T. WYMAN.